Oct. 20, 1953
C. K. VILAND
2,656,305
CRACKING WITH MIXED CATALYSTS
Filed March 16, 1950
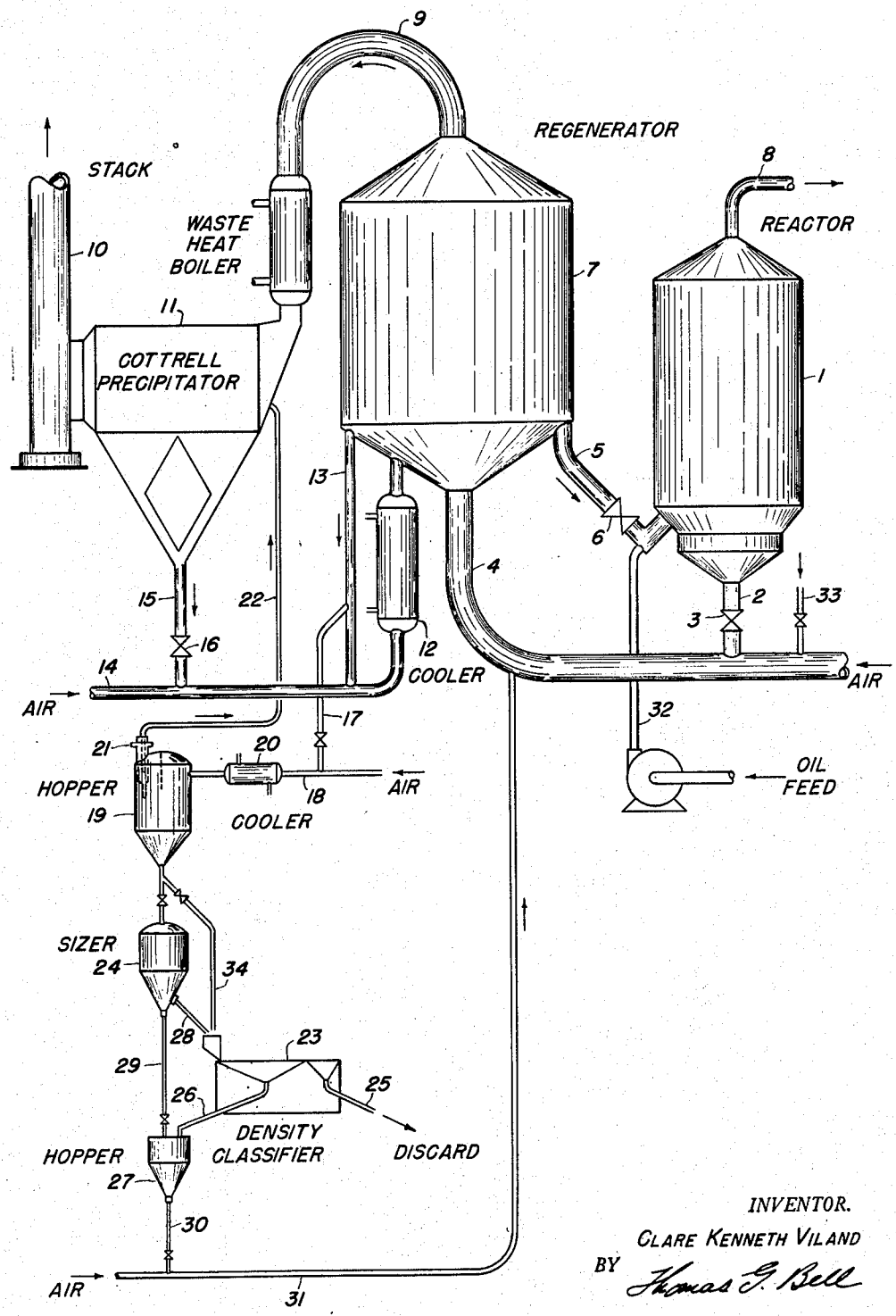
INVENTOR.
CLARE KENNETH VILAND
BY Thomas G. Bell
AGENT Patented Oct. 20, 1953

2,656,305

UNITED STATES PATENT OFFICE 2,656,305

CRACKING WITH MIXED CATALYSTS

Clare Kenneth Viland, Martinez, Calif., assignor to Tide Water Associated Oil Company, San Francisco, Calif., a corporation of Delaware Application March 16, 1950, Serial No. 149,915

1 Claim. (Cl. 196—52)

This invention relates to the cracking of hydrocarbon oils by the use of catalysts to produce gasoline and other products. More particularly the invention is concerned with catalytic cracking using mixtures of two or more catalysts of substantially different catalytic properties whereby the respective advantages of each may be more fully realized and desired qualities of the cracked products may be controlled more economically.

In the art of catalytic cracking it is well known that, under comparable conditions, different types of catalysts vary widely in a number of important characteristics, such as activity or ability to convert oil to lighter products, selectivity or ability to produce maximum quantities of desired products with minimum production of undesired products, resistance to aging or ability to retain a high degree of activity and/or selectivity during repeated use, and finally the initial cost. Illustrative of these variations are the comparative properties of the two most widely used catalysts, namely, synthetically precipitated silica-alumina gels and acid-treated naturally-occurring montmorillonite clays. As compared to the natural catalyst, the synthetic catalyst exhibits greater activity, greater resistance to aging, and a higher production of olefinic C4-hydrocarbons for a given gasoline yield. On the other hand, the natural catalyst has the advantages of greatest gasoline yield per unit weight of coke formation and a much lower per ton cost. Other synthetic catalysts such as precipitated silica-magnesia exhibit properties similar to the synthetic silica-alumina, while other natural catalysts such as acid-treated kaolin are more similar to the montmorillonite clays. Accordingly, for simplicity, the invention will be illustrated with respect to the above mentioned two most widely used catalysts and, unless otherwise indicated, the term "synthetic catalyst" will refer to the precipitated silica-alumina type and the term "natural catalyst" will refer to acid-treated montmorillonite clay. In Table I there are listed representative data illustrating comparative product distribution which may be expected from natural and synthetic catalysts.

TABLE I

|  | Equilibrium Filtrol-D Natural Catalyst | | Equilibrium American Cyanamid Grade-G Synthetic Catalyst | |
|---|---|---|---|---|
| Catalyst from Commerical Unit: | | | | |
| U. O. P. Weight Activity | 23 | | 20–22 | |
| Average Replacement rate, Lb./Bbl | 1.08 | | 0.17 | |
|  | B./D. | #/Hr. | B./D. | #/Hr. |
| Comparison from Pilot Plant Data: | | | | |
| Charge, 22° API | 23,000 | 308,890 | 23,000 | 308,890 |
| Products— | | | | |
| Coke | | 19,000 | | 19,000 |
| Dry Gas—as Fuel Oil Equiv | 1,092 | 10,087 | 1,144 | 11,882 |
| Propylene | 724 | 5,481 | 1,069 | 8,093 |
| Propane | 323 | 2,547 | 446 | 3,312 |
| Butylenes | 1,005 | 8,849 | 1,168 | 10,327 |
| Butanes | 536 | 4,451 | 782 | 6,494 |
| C5–400 gasoline | 8,579 | 96,840 | 7,793 | 88,125 |
| Gas Oil | 11,845 | 161,635 | 11,822 | 161,567 |
| Total | | 308,890 | | 308,890 |

As will be readily apparent from the foregoing, the refiner's choice of catalyst will depend largely upon the type of products most desired. If large amounts of olefinic gases are desired (for example, for use in subsequent alkylation processes) synthetic catalyst would normally be chosen, with the higher cost being offset by longer catalyst life. On the other hand, if maximum gasoline production is desired, natural catalyst would be indicated. In the latter case, due to the more rapid decline in activity of the natural catalyst, frequent replacement of the catalyst with fresh catalyst is required to maintain optimum economic conditions. Such replacement is generally accomplished by withdrawing (either continuously or intermittently) catalyst from the cracking system and adding an equal amount of new catalyst, thereby maintaining an approximate activity equilibrium in the system.

In order to obtain products intermediate to those obtainable by use of the available synthetic and natural catalysts, while still operating the cracking facilities under optimum conditions, it has been proposed by some to use both types of catalyst simultaneously. This, however, has great disadvantages. If separate apparatus is used for each type of catalyst, investment and labor costs are high due to the necessity of building and operating duplicate equipment. On the other hand, if one should attempt to use a mixture of both types of catalyst simultaneously in a single catalytic cracking unit of the usual design, frequent replacement of the mixture would be dictated by the rate of decline of activity of the low-lifed natural catalyst resulting in premature discarding of large amounts of high-priced synthetic catalyst of high activity.

The present invention provides for the simultaneous use of two catalysts, such as the above mentioned natural and synthetic catalysts, in admixture with each other in a single cracking system with subsequent separation of the two catalysts. It thereby permits the discarding and replacement, either in whole or in part, of the catalyst having the shorter life while returning the catalyst of longer life to the cracking system for further use. By use of the invention other advantages may be obtained, for example, a small amount of synthetic catalyst may be added to a cracking system operating upon natural catalyst to butt-up its activity when the activity is lower than desired due to continued use or to originally inferior quality of the natural catalyst. Another advantage is the ability, when operating mainly on synthetic catalyst, to maintain in the system a small amount of relatively fresh natural catalyst which latter is frequently replaced for the purpose of selectively adsorbing from the hydrocarbon charge various detrimental materials, such as iron, nickel, vanadium, copper and other compounds. The invention also provides a practicable means of changing from natural to synthetic catalyst (or from synthetic to natural catalyst) without discontinuing the cracking operations and without waiting for normal losses, withdrawals and replacements to accomplish the change-over. In a specific form of the invention, synthetic catalyst is mixed with a small amount of natural catalyst the presence of which tends to act as a lubricant for the synthetic catalyst, thereby reducing the erosive action of the latter upon the cracking apparatus.

The invention is based upon the fact that catalysts of widely varying cracking characteristics, such as natural and synthetic catalysts, have markedly different particle densities and correspondingly different apparent bulk densities, and upon the utilization of particle-density classification means for separating one catalyst from the other in a mixture of the two. Table II illustrates the difference between the particle densities and apparent bulk densities of representative samples of natural and synthetic catalysts.

TABLE II

| Type of Catalyst | Particle Density | | Apparent Bulk Density | |
|---|---|---|---|---|
| | Fresh | Used [1] | Fresh | Used [1] |
| Filtrol D Natural | 1.2 | 1.4 | .72 | 0.85 |
| Syntrol Natural | 1.2 | 1.4 | .72 | 0.85 |
| Filtrol SR Natural | 1.45 | 1.65 | .88 | 1.0 |
| American Cynamid, Grade MSA Synthetic | 0.8 | 0.9 | 0.5 | 0.6 |
| American Cynamid, Grade G Synthetic | 0.9 | 1.0 | 0.5 | 0.6 |

[1] Dependent upon degree of use.

Although adapted for various types of catalytic cracking, the invention is particularly suited for use in conjunction with the well-known "fluid" method of catalytic cracking wherein the catalyst in powdered form is maintained in mobile condition resembling a fluid in the reactor and regenerator. This mobile condition of the catalyst permits its easy transfer through pipes between the reactor and regenerator and elsewhere. Accordingly, the invention is described below in connection with such a fluid process and is so illustrated in the accompanying drawing which depicts in more or less diagrammatic form a flow diagram of the invention in relation to certain main parts of a fluid catalytic cracking plant.

In the drawing there are shown reactor 1 and regenerator 7 of a fluid catalytic cracking system. Line 2 controlled by valve 3 and line 4 are provided for transferring spent catalyst from reactor 1 to regenerator 7, and line 5 controlled by valve 6 for transferring regenerated catalyst from regenerator 7 to reactor 1. Transfer line 8 connects reactor 1 to the distilling equipment (not shown) and flue gas line 9 connects regenerator 7 to chimney 10. As is apparent, reactor 1 and regenerator 7 will normally be provided with internal cyclones or other means of trapping out catalyst fines from their respective outlet gases, although other precipitating or separating means may be provided in either of lines 8 or 9 such as is illustrated by Cottrell precipitator 11. In accordance with common practice there may also be provided cooler 12 for reducing the temperature of the catalyst in the regenerator, cooler 12 being supplied with hot catalyst through line 13 which is caused to circulate through the cooler and back to the regenerator by means of air supplied through line 14. The air in line 14 may also be a convenient means for returning to the cracking system catalyst which has been separated by Cottrell precipitator 11. As shown on the drawing, such separated catalyst enters line 14 through line 15 and valve 16.

For practicing the invention there may be provided catalyst draw-off lines 17 and 18 discharging into hopper 19 through cooler 20. Hopper 19 may be provided with a cyclone 21 or other means of precipitating catalyst fines and air-exit line 22. There is also provided apparatus suitable for separating the catalyst according to particle density such as illustrated in the drawing by classification table 23 (which may conveniently be a table of the type described in U. S. Patent 2,206,337 issued July 2, 1940, to E. G. Steele) adapted to receive catalyst from hopper 19. A preliminary particle sizer 24 may advantageously be inserted between hopper 19 and classification table 23. Classification table 23 is provided with discard line 25 and return line 26 discharging into hopper 27. Sizer 24 is provided with line 28 for feeding coarse particles to table 23 and line 29 for discharging fine particles to hopper 27. Hopper 27 is provided with return lines 30 and 31 for returning catalyst to the cracking system at any convenient point, such as into line 4 as illustrated.

The following procedure is illustrative of the invention when used in conjunction with apparatus similar to that depicted in the drawing.

In accordance with principles well understood in the art, in reactor 1 a bed of powdered catalyst is maintained in a mobile condition, resembling a fluid, by means of oil vapors passing upwardly therethrough which are undergoing cracking. Feed oil to be cracked enters reactor 1 through line 32. Heat to vaporize the oil and to provide the required temperature for cracking is supplied by hot catalyst entering reactor 1 from regenerator 7 through line 5. The cracked products leave through line 8 for fractionation, and any desired further refining. In regenerator 7 a bed of catalyst undergoing regeneration is maintained in a similar fluid condition by means of an air stream entering through line 4 which air provides the oxygen for regeneration of the catalyst. Spent catalyst accumulating in the bottom of reactor 1 is stripped of entrained hydrocarbons by means of steam and is passed through line 2 and valve 3 into line 4 wherein the air stream conveys it to regenerator 7. Regenerated catalyst is withdrawn from regenerator 7 and returned by gravity to reactor 1 through valve 6 and line 5 to complete the cycle. Products of combustion leave regenerator 7 through line 9 whence they pass through Cottrell precipitator 11 and are then discharged through stack 10. Fine catalyst particles precipitated from the stack gas in Cottrell precipitator 11 accumulate in the bottom thereof and are returned to the regenerator through lines 15 and 14 and cooler 12 by means of air entering line 14.

As this cyclic process continues, the catalyst in the system becomes gradually reduced in efficiency or "activity" so that a time is ultimately reached when the catalyst must be replaced with fresh catalyst. Although some fresh catalyst is generally added to the system from time to time to replace catalyst lost through entrainment in the flue gases from the regenerator, in many cases this amount of fresh catalyst is not sufficient to maintain the average activity of the catalyst in the system at an economic or desired value. This is particularly true when natural catalyst is in use due to its more rapid decline in activity. Accordingly, especially with natural catalyst, it is common practice to continuously, or intermittently, withdraw and discard a small portion (say, about 1% per day) of the catalyst from the system and to replace that discarded with fresh catalyst in order to maintain a desired activity level in the system. The catalyst may be withdrawn from any convenient point in the system, such as for example from line 13, and make-up catalyst may be added at another convenient point such as through line 33.

Due to the thorough mixing of the catalyst within the reactor and regenerator, it is obvious that the portions withdrawn for discard will have the same approximate composition as the main body of catalyst and, when a mixture of synthetic and natural catalyst is employed, the withdrawn portions will contain a proportionate amount of synthetic catalyst of high activity along with the natural catalyst intended for discard. In accordance with the present invention a method has been devised whereby the natural catalyst may be separated from the portions so withdrawn and the remaining synthetic catalyst returned to the system, thereby greatly reducing the amount of synthetic catalyst required to maintain desired equilibrium conditions.

To this end and illustrative of the invention, a small stream of regenerated catalyst is withdrawn from a convenient point of the system (such as from line 13 as illustrated) through line 17 and fed to hopper 19 by means of a current of air in line 18. In order to reduce the temperature of the withdrawn catalyst, cooler 20 is provided through which the air and catalyst stream pass before entering hopper 19. In hopper 19 the air separates from the catalyst and leaves through line 22. In order to avoid loss of any entrained catalyst, the air in line 22 may be conducted into the catalytic system at some convenient point, such as is illustrated by line 22 entering the inlet of precipitator 11.

Catalyst from hopper 19 is fed to classification apparatus 23, either directly as through line 34 or, preferably, through preliminary sizer 24 wherein the finer catalyst particles are first removed for return to the catalytic system through line 29 and hopper 27 while the coarser catalyst particles only are fed to density classifier 23 through line 28. As aforesaid, density classifier 23 may be any type of apparatus capable of sorting catalyst particles according to their densities and may advantageously be (as indicated in the drawing) a baffled shaker table on which the lighter catalyst particles are floated to one end and withdrawn through line 26 into hopper 27 and the heavier particles are conveyed to the other end and are discharged through line 25. Due to the aforementioned difference in particle density between synthetic and natural catalysts, the particles discharged through line 25 will be predominately, if not entirely, natural catalyst.

The purpose of sizer 24 is two-fold. First, even with efficient operation of the Cottrell precipitator 11, a substantial amount of fine catalyst particles are generally entrained in the gases discharged through stack 10, making it desirable not to discard additional quantities of the finer catalyst. Discarding of only coarser catalyst through line 25, therefore, helps to maintain a desired balance between coarse and fine catalyst in the cracking system. Second, the operation of table 23 is more efficient when operating with coarser particles only.

To maintain the desired catalyst equilibrium in the system, sufficient fresh natural catalyst is added through line 33 to compensate for the used natural catalyst discarded from line 25 and for natural catalyst fines lost through stack 10. Likewise, sufficient synthetic catalyst is added through line 33 to compensate for synthetic catalyst fines lost through stack 10 and for the small amount of synthetic catalyst, if any, which may be contained in the discard from line 25.

The following examples of operating a fluid catalytic cracking process with natural and synthetic catalyst will more fully illustrate specific embodiments of the invention:

*Example I*

In the operation of a fluid catalytic cracking unit processing about 20,000 barrels per day of heavy California vacuum distillate of approximately 22° API gravity, it may be desired to employ a mixture of 300 tons of synthetic catalyst and 400 tons of natural catalyst in the reaction-regeneration cycle in order to obtain products intermediate to those obtainable with synthetic and natural catalyst alone, while operating the plant under optimum economic conditions. Under such conditions it may be found that replacement of the synthetic catalyst in the mixture at the rate of 0.2–0.4% per day and replacement of the natural catalyst at the rate of 1.0–2.0% per day will maintain a satisfactory equilibrium activity with respect to both catalysts in the mixture. Even under excellent operating conditions, it is common for the stack losses of catalyst fines to amount to 0.2 to 0.3% per day of the total catalyst in use. Consequently, synthetic catalyst added to compensate for such losses would normally be sufficient to maintain the desired replacement rate for the synthetic catalyst. On the other hand, the desired replacement rate for the natural catalyst would be substantially higher than that occasioned by stack losses alone. To provide for the required natural catalyst replacement, about 100 tons per day of the catalyst mixture is withdrawn from the regenerator, and sized into a fine and a coarse fraction, the fines being predominately smaller than 200 mesh and the coarse predominately larger than 200 mesh. The two fractions may be equal in amount, more or less, but their ratio will depend upon the percentage of fines in the mixture. The fines are returned to the unit for re-use while the coarse particles are subjected to selective separation by density on a classification table. The various adjustments of the classification table, such as deck inclination, speed of vibration, and air volume, are set to remove from the coarse fraction a cut of heaviest particles equal in amount to the natural catalyst to be discarded, or about 4 tons per day. The remainder of the coarse fraction is collected and returned to the unit for re-use. To compensate for the catalyst so rejected from the system and that lost through the stack, fresh synthetic and natural catalysts are added, the proportion of each being about 1 to 5. Table III summarizes the catalyst data of this example.

TABLE III

|  | Synthetic Catalyst | Natural Catalyst | Total |
| --- | --- | --- | --- |
| Equilibrium Quantity (tons) | 300 | 400 | 700 |
| Required Replacement Rate (tons/day) | 1 | 5 | 6 |
| Stack Losses (tons/day) | 0.9 | 1.2 | 2.1 |
| Withdrawal for Classification (fed to Sizer) (tons/day) | 43 | 57 | 100 |
| Sizer Fines (returned to Unit) (tons/day) | 22 | 29 | 51 |
| Sizer Coarse (fed to Shaker-table) (tons/day) | 21 | 28 | 49 |
| Shaker-table Light Cut (returned to Unit) (tons/day) | 20.9 | 24.2 | 45.1 |
| Shaker-table Coarse Cut (rejected) (tons/day) | 0.1 | 3.8 | 3.9 |
| Fresh Catalyst Added (tons/day) | 1 | 5 | 6 |

*Example 2*

In the operation of a fluid catalytic cracking plant charging about 22,000 barrels per day of gas oil vacuum distillate and employing 800 tons of mixed catalyst (composed of 16–20% amorphous synthetic catalyst and the remainder natural catalyst of crystalline structure) it was desired to increase the proportion of synthetic catalyst in the mixture. To make room for the desired addition of synthetic catalyst a stream of mixed catalyst from the regenerator was sized and the coarser particles classified by density on a shaker-table as above described, rejecting the heavy particles from the shaker-table and returning the lighter particles to the catalytic system along with the fines from the sizer. Examination of the heavy rejected catalyst particles under polarized light in a petrographic microscope showed clearly that substantially all of this material was optically active natural catalyst particles. Samples of the normal stack losses, and of the regenerated catalyst from the regenerator showed proportions of optically active and inactive particles in about the same ratio as the natural and synthetic catalyst known to be present. Under this method of operation, the desired objective of increasing the proportion of synthetic catalyst in the system, without suffering losses thereof by otherwise necessary conventional withdrawals to make room for additions of fresh catalyst, was being accomplished.

While the invention is above described in conjunction with the operation of the fluid catalytic cracking process, which is its most preferred form, the principles of the invention may be adaptable to other forms of catalytic cracking such as, for example, the well-known "thermofor" process wherein a moving bed of catalyst pellets are used. By proper design of classification equipment, pellets of natural catalyst may be separated by density from pellets of synthetic catalyst even though of substantially the same size. As is obvious, with pelleted catalyst the preliminary sizing operation described may be omitted.

I claim:

In a process of catalytically cracking hydrocarbons wherein a body of powdered catalyst in the form of a fluid bed is contacted with hydrocarbon vapors to be cracked in a reaction zone, a body of catalyst is contacted with oxygen in a regeneration zone, catalyst is continuously transferred from said reaction zone to said regeneration zone, catalyst is continuously transferred from said regeneration zone to said reaction zone, and said catalyst in the reaction and regeneration zones is composed of a mixture of two types, one type being synthetically precipitated silica-alumina gels, the particle density of which increases from about 0.8 when fresh to about 1.0 when used and the apparent bulk density increases from about 0.5 to about 0.6, the other type being acid-treated montmorillonite clays, the particle density of which increases from about 1.2 when fresh to about 1.65 when used and the apparent bulk density increases from about 0.72 to about 1.0 so that the two types of catalyst when in fresh condition differ from each other in particle density to a greater extent than the differences between new and aged catalyst of each type, said mixture having a resulting product distribution intermediate that of the two said materials, the method of avoiding the removal of a proportionate amount of the expensive, long-lifed synthetic catalyst along with the cheaper short-lifed natural catalyst when it is desired to maintain a desired activity level in the system, which comprises: withdrawing from the regeneration zone a quantity of mixed catalyst, cooling the withdrawn mixture, separating the finer particles, smaller than 200 mesh, from the withdrawn mixture and returning them to the system, separating by density the remaining coarser particles into a smaller quantity of heavier particles for discard, and a larger quantity of lighter coarser particles for reuse, whereby the discarded quantity will be composed predominately, if not entirely, of natural catalyst and the desired catalyst equilibrium in the system may be maintained by replacing synthetic catalyst to equal that lost to the stack, and replacing the amount of natural catalyst lost to the stack, plus the quantity of natural catalyst discarded, roughly one per centum per day.

CLARE KENNETH VILAND.

(References on following page)

References Cited in the file of this patent

UNITED STATES PATENTS

| Number | Name | Date |
|---|---|---|
| 2,353,119 | Workman | July 4, 1944 |
| 2,361,978 | Swearingen | Nov. 7, 1944 |
| 2,483,372 | Payne | Sept. 27, 1949 |
| 2,567,207 | Hoge | Sept. 11, 1951 |

OTHER REFERENCES

Comparison of Bead and Clay Catalyst, Evans Oil and Gas Journal, vol. 44, March 30, 1946, pages 167, 168, 172, 173, 177, 178, 181, 183.

"Steam Aging of Cracking Catalysts," Shabaker, Houdry Pioneer, vol 3, No. 1, May 1948, pages 6, 7 and 8.